United States Patent [19]
Li

[11] Patent Number: 5,999,290
[45] Date of Patent: Dec. 7, 1999

[54] OPTICAL ADD/DROP MULTIPLEXER HAVING COMPLEMENTARY STAGES

[75] Inventor: Yuan P. Li, Duluth, Ga.

[73] Assignee: Lucent Technologies Inc., Murray Hill, N.J.

[21] Appl. No.: 08/958,496

[22] Filed: Oct. 27, 1997

[51] Int. Cl.$^6$ .................................................. H04J 14/02
[52] U.S. Cl. ......................... 359/127; 359/124; 359/128; 385/24
[58] Field of Search ........................... 359/124, 127–128, 359/130; 385/24

[56] References Cited

U.S. PATENT DOCUMENTS

| | | | |
|---|---|---|---|
| 4,904,042 | 2/1990 | Dragone | 350/96.16 |
| 5,002,350 | 3/1991 | Dragone | 350/96.15 |
| 5,136,671 | 8/1992 | Dragone | 385/46 |
| 5,412,744 | 5/1995 | Dragone | 385/24 |
| 5,467,418 | 11/1995 | Dragone | 385/37 |
| 5,488,680 | 1/1996 | Dragone | 385/24 |
| 5,502,781 | 3/1996 | Li et al. | 385/4 |
| 5,542,010 | 7/1996 | Bernard et al. | 385/14 |
| 5,611,016 | 3/1997 | Fangmann et al. | 385/100 |
| 5,612,805 | 3/1997 | Fevrier et al. | 359/124 |
| 5,748,350 | 5/1998 | Pan et al. | 359/127 |

FOREIGN PATENT DOCUMENTS 0720408  7/1996  European Pat. Off. .

OTHER PUBLICATIONS

D. Trouchet, et al., "Passband Flattening of PHASAR WDM using Input And Output Star Couplers Designed With Two Focal Points", Conference On Optical Fiber.

Y. P. Li, et al., "Silica–based Optical Integrated Circuits", IEE Proc.–Optoelectron, vol. 143, No. 5, Oct. 1996, pp. 263–280.

*Primary Examiner*—Kinfe-Michael Negash
*Attorney, Agent, or Firm*—Michael A. Morra

[57] ABSTRACT

An add/drop multiplexer (ADM) 100 includes an optical demultiplexer 200 and an optical multiplexer 300 that are connected in series. The optical multiplexer and the optical demultiplexer each include a number of corresponding passbands, which means that the central wavelengths of the multiplexer's passbands are approximately equal to the central wavelengths of the demultiplexer's passbands. The performance of the ADM is improved by making the edges of corresponding passbands complementary to each other. In one illustrative design, the transmission of the demultiplexer decreases at its passband edges as the wavelength moves away from its central wavelength, whereas the transmission of the multiplexer increases as the wavelength moves away from its central wavelength. The resultant cascaded passband of the pair is wider than the passband of the demultiplexer alone, thereby increasing the number of ADMs in a chain for the same performance. Not surprisingly, the advantages of the present invention are most evident in a wavelength-division-multiplexed system having many geographically separated locations 71–74 interconnected by an optical transmission path, and where selected channels of information need to be inserted or removed from the optical transmission path.

13 Claims, 6 Drawing Sheets

OPTICAL ADD/DROP MULTIPLEXER HAVING COMPLEMENTARY STAGES

TECHNICAL FIELD

This invention relates to optical devices that perform an add/drop multiplexing function and, more particularly, to the transmission characteristics of such devices.

BACKGROUND OF THE INVENTION

The information superhighway will primarily comprise optical fibers for the foreseeable future because of the enormous bandwidth that each optical fiber provides. For example, an optical fiber exhibits relatively low loss over the wavelength region 820–1600 nanometers. This particular region provides a bandwidth of about 180,000 GHz which means that a single optical fiber can potentially carry 45 billion voice channels (4 kHz each) or 30 million television channels (6 MHz each). And while these numbers represent upper limits that are not practical to attain, they provide a compelling reason for communication carriers to use optical transmission.

However, in order to fully utilize this information superhighway, there needs to be convenient equipment for inserting and removing individual optical channels, or groups of channels, at multiple intermediate locations along an optical fiber path. Equipment that performs this function is not surprisingly known as an optical add/drop multiplexer (ADM), and it generally comprises a demultiplexer connected in series with a multiplexer. Between the demultiplexer and the multiplexer, another optical device is used to add and/or remove selected channels.

However, because the ADMs are cascaded in large optical networks, the transmission characteristic of each channel that undergoes demultiplexing and multiplexing is narrowed—a phenomenon that can be readily understood by recognizing that cascading these passive devices is equivalent to multiplying their individual transmission functions together. For example, assuming that the transmission characteristic of one particular channel of an ADM has a normalized magnitude of 1.0 at the center of its passband and 0.8 at its edges, then the transmission characteristic of that particular channel through two ADMs is still 1.0 at the center, but is now 0.8×0.8=0.64 at the edges. The resulting passband thus has a more pronounced central peak, which effectively reduces the usable bandwidth of each passband. Accordingly, the number of ADMs that can be cascaded is also reduced.

Optical multiplexing and demultiplexing is frequently accomplished via a pair of star couplers that are interconnected by an optical grating (i.e., a number of parallel waveguides—each differing in length with respect to its nearest neighbor by a predetermined fixed amount). Examples of such interconnected star couplers, known as Dense Wave Division Multiplexers (DWDMs), are shown in U.S. Pat. Nos. 5,002,350 and 5,136,671 and 5,412,744. In one direction of optical transmission, the DWDM can be used as a multiplexer wherein a plurality of separate and distinct wavelengths ($\lambda_1$, $\lambda_2$. . . $\lambda_n$, ) are launched into different input ports of one star coupler and emerge on a single output port of the other star coupler. In the other direction of optical transmission, the DWDM can be used as a demultiplexer wherein a plurality of different wavelengths are launched into a single port of one star coupler and emerge on multiple ports of the other star coupler according to their particular wavelengths. An ADM can therefore be built using two DWDMs connected back-to-back.

Techniques are known for making the passband of a DWDM relatively wide and flat. For example, U.S. Pat. No. 5,412,744 achieves wide and flat passbands by coupling adjacent waveguides at the input or at the output of the DWDM. Further, application Ser. No. 08/682,453 was filed on Jul. 17, 1996 by the present inventor, and it achieves wide and flat passbands by installing multiple power splitters in the same DWDM. Nevertheless, when such DWDMs are cascaded in an ADM configuration, it is desirable to further improve the transmission characteristics of the individual passbands.

SUMMARY OF THE INVENTION

A novel optical device consists of an optical multiplexer and an optical demultiplexer that are connected in series. The optical multiplexer and the optical demultiplexer each include a number of corresponding passbands, which is to say that the central wavelengths of the multiplexer's passbands are approximately equal to the central wavelengths of the demultiplexer's passbands. The overall transmission characteristic of the optical device is improved by making the edges of corresponding passbands complementary to each other.

In an illustrative embodiment of the invention, the demultiplexer passbands have narrower bandwidths than the corresponding multiplexer passbands. Illustratively, transmission gain is measured between the edges of the passband (e.g., those wavelengths where the gain is about 2 dB below the gain at the central wavelength). At the edges of the demultiplexer passbands, the transmission gain decreases as wavelengths move farther away from the central wavelength; whereas the transmission gain of the multiplexer increases in a complementary manner such that the passband of the cascaded demultiplexer/multiplexer is flatter than either of the individual passbands.

The advantages of the present invention are most evident in a wavelength-division-multiplexed system that operates over an optical transmission path that includes a number of geographically separated locations where selected channels of information need to be added to, or dropped from, the transmission path.

BRIEF DESCRIPTION OF THE DRAWING

The invention and its mode of operation will be more clearly understood from the following detailed description when read with the appended drawing in which.

DETAILED DESCRIPTION

The present invention relates to planar waveguides whose construction is generally understood and described in numerous articles and patents. The most advanced and technically developed planar waveguides are doped-silica waveguides fabricated with silicon optical bench (SiOB) technology. A doped-silica waveguide is usually preferred because it has a number of attractive properties including low cost, low insertion loss, low birefringence, stability, and compatibility for coupling to fiber. Further, the processing steps are compatible with those in silicon integrated circuit (IC) technology, which are geared for mass production and are readily known.

Generally, a doped-silica waveguide is formed by initially depositing a base or lower cladding layer of low index silica on a silicon or silica substrate. A layer of doped silica with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. This technology is generally described in an article entitled: *Silica-based optical integrated circuits* by Y. P. Li and C. H. Henry at Vol. 143, No. 5, *IEE Proceedings on Optoelectronics*, pages 263–280 (October 1996), which is hereby incorporated by reference.

Figure 1:
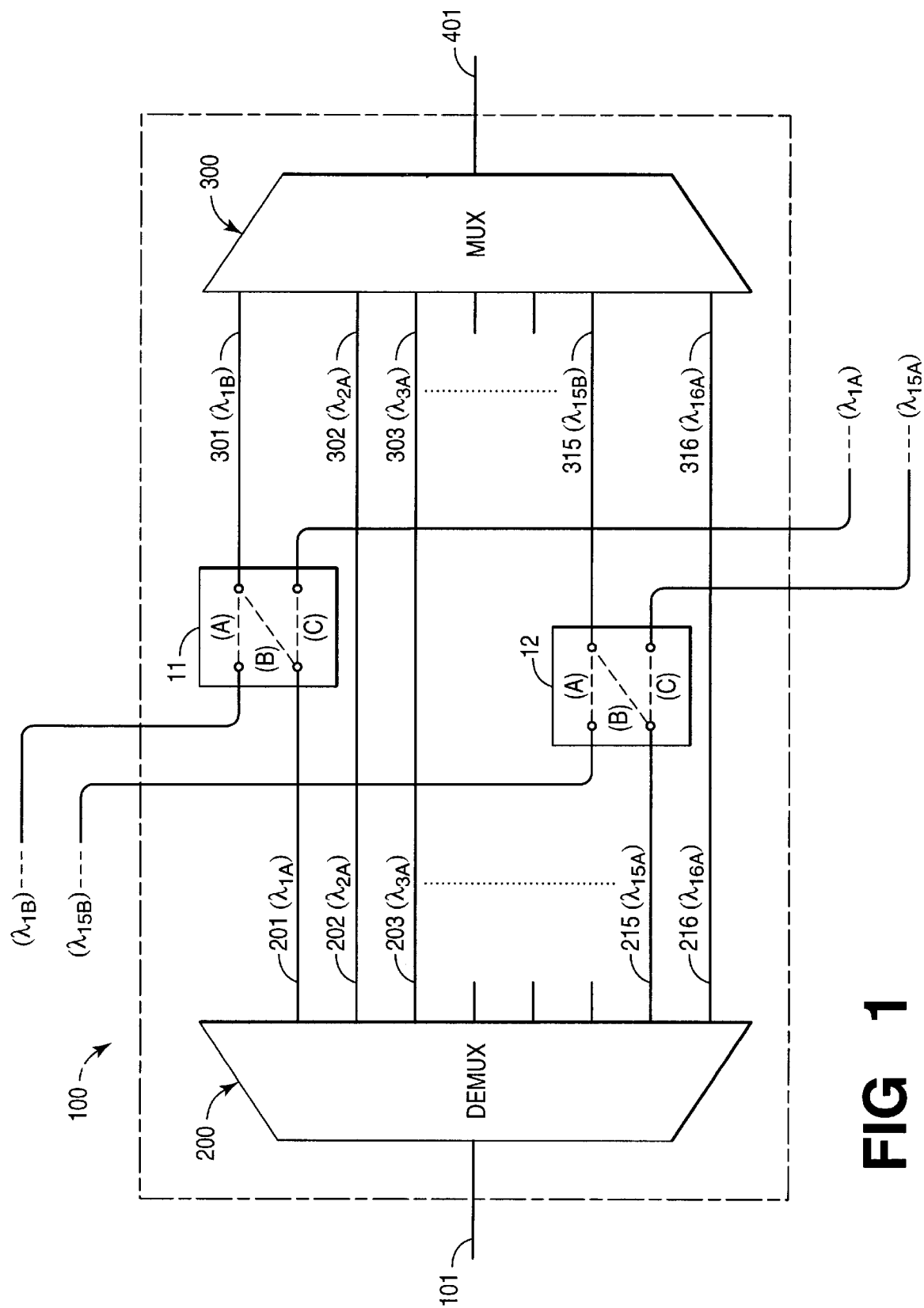
FIG. 1 discloses an add/drop multiplexer (ADM) in accordance with the present invention.

FIG. 1 shows an ADM 100 that services sixteen channels operating at different nominal wavelengths ($\lambda_1, \ldots, \lambda_{16}$). These channels are immediately adjacent to each other with a spacing of, for example, 0.8 nanometers (nm). These channels illustratively reside in the 1550 nm range. Incoming channels on waveguide 101 are denoted by the subscript "A," whereas channels that are added at this location are denoted by the subscript "B." Demultiplexer (demux) 200 separates a multiplexed optical signal that is present on waveguide 101 into its component channels and makes them available on output leads 201–216; whereas multiplexer (mux) 300 combines input channels, on leads 301–316, into a composite output signal for transmission on waveguide 401.

A conventional 2×2 optical waveguide switch 11 is used, for example, to extract channel $\lambda_{1A}$ and add channel $\lambda_{1B}$. Channels $\lambda_{1A}$ and $\lambda_{1B}$ operate at the same nominal wavelength (i.e., $\lambda_1$), but carry different information. Similarly, optical waveguide switch 12 routes its input channels $\lambda_{15A}$ and $\lambda_{15B}$ in two different directions to provide add/drop functionality. It is understood that channels may be dropped without necessarily adding others. In the present invention, electromechanical switching is used to perform on/off switching. However, other switching techniques are known, and are disclosed in U.S. Pat. No. 5,502,781.

Optical switch 11, for example, shows three paths (A, B, C) between its input and output ports. Path A is enabled when an input optical signal, $\lambda_{1B}$, is to be added. Path B is enabled when input optical signal, $\lambda_{1A}$, is to continue through ADM 100 to a distant location. Finally, path C is enabled when input optical signal, $\lambda_{1A}$, is to be dropped from ADM 100. It is noted that paths A and B cannot both be enabled at the same time. It is also noted that optical switches can be associated with each of the channels for maximum flexibility, and cost, or only with selected channels.

Optical Demultiplexer

Figure 2A:
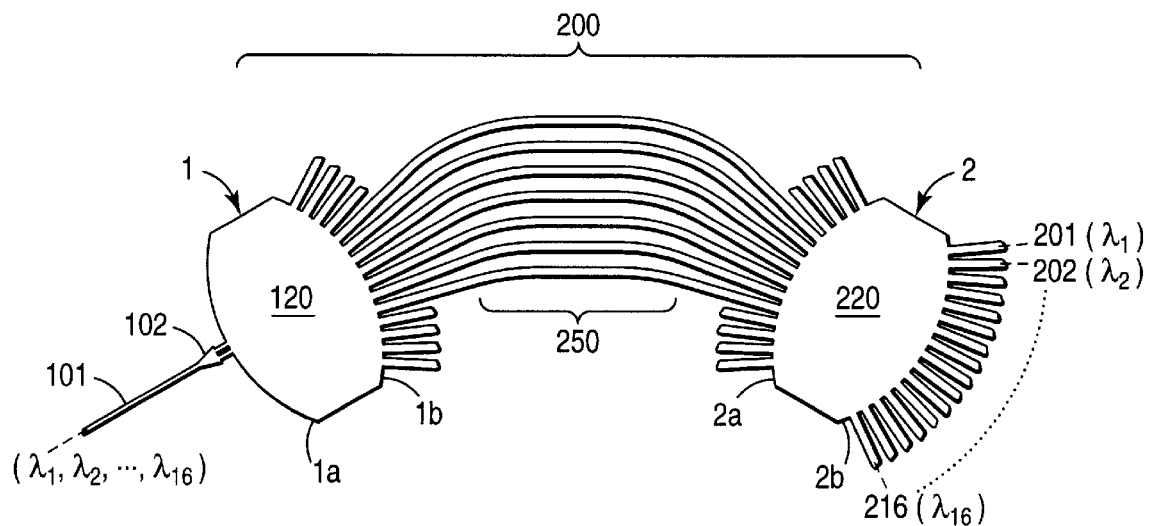
FIG. 2A discloses details of the optical demultiplexer used in the ADM of FIG. 1.

An optical demultiplexer operates much like a prism, which takes a beam of white light at its input and separates its various colors at its output. In optical demultiplexers, however, the input light beam comprises a limited number of colors ($\lambda_1, \lambda_2, \ldots, \lambda_n$) at a single input waveguide, and each color is precisely directed to a particular one of n output waveguides. Such a demultiplexer is illustratively shown in FIG. 2A, but is more completely disclosed in U.S. Pat. No. 5,136,671. Optical demultiplexer 200 comprises a pair of star couplers 1, 2 that are interconnected by a diffraction grating 250, which is made from a plurality of unequal-length optical waveguides. The length of each waveguide in the grating 250 differs from the lengths of all other waveguides in the grating by different amounts so that the same optical signal is phase shifted by different amount when it reaches then end of the grating.

Figure 2B:
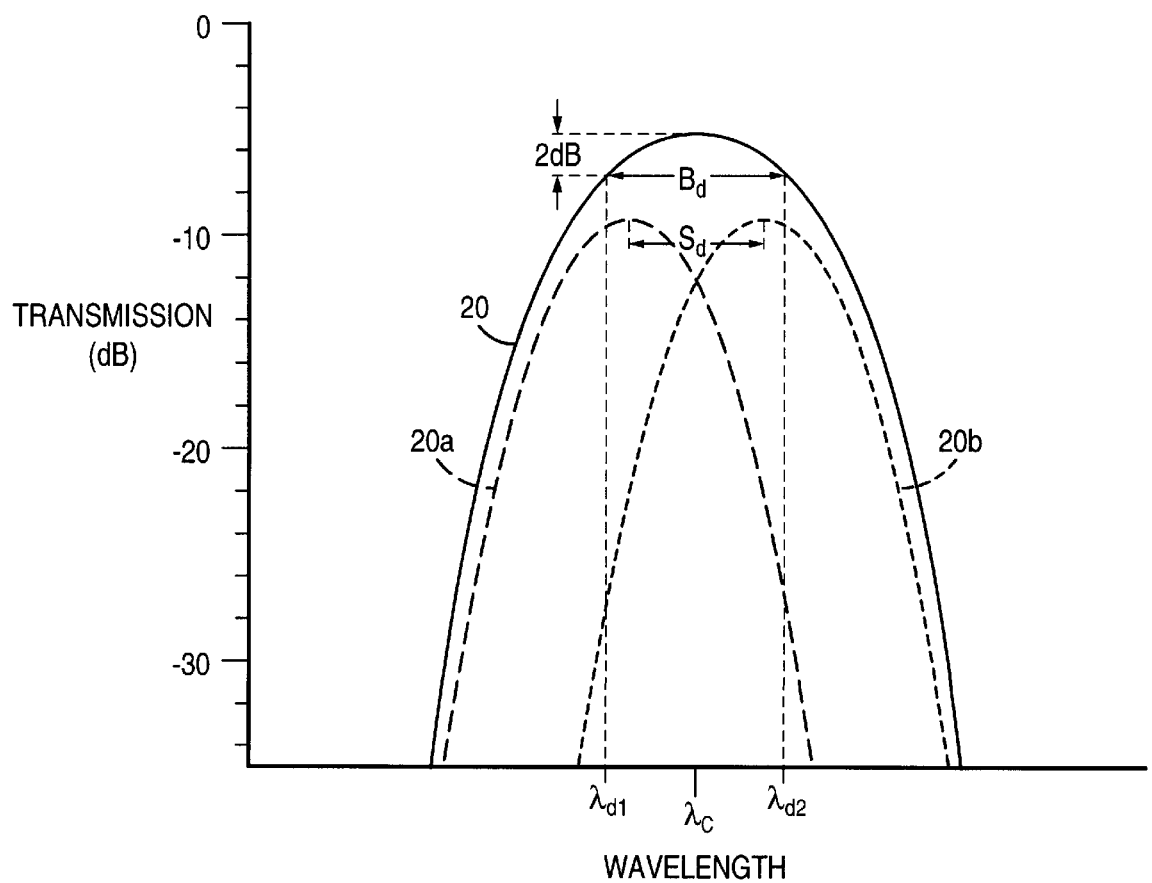
FIG. 2B shows the transmission characteristic of one representative channel of the optical demultiplexer of FIG. 2A.

A star coupler couples the lightwaves from any input to all of the outputs without wavelength selectivity. It is widely used as a basic cross-connect element in passive optical networks. Ideally, the optical power from any input splits evenly into all the outputs without power loss, so that each output receives an equal portion of the input power. Star coupler 1 includes a dielectric slab 120 which comprises a free-space region having two curved, preferably circular, boundaries 1a and 1b. Power transfer in star coupler 1 is accomplished through radiation in the dielectric slab 120 between its input and output waveguides. Note that a power splitter 102 is connected to input waveguide 101, and its purpose is to shape the transmission characteristic of the individual passbands, one of which is shown in FIG. 2B. It is noted that although power splitter 102 is a conventional Y-branch splitter, the power splitting function can be accomplished by other techniques to achieve the same desired result. For example:

Power splitting can be accomplished by shaping the dielectric slab to have two focal points. Such a device has been reported in the Technical Digest of the 1997 Optical Fiber Conference at pages 302–303 by D. Trouchet et al.

The waveguides of the diffraction grating 250 (see FIG. 2A) can be grouped according to length ($l_i$) into at least two groups to form a power splitter. The first group has lengths that differ from each other by multiples of a first predetermined length ($\Delta l_1$); whereas the second group of waveguides has lengths that differ from each other by multiples of a second predetermined length ($\Delta l_2$); where $\Delta l_1 \neq \Delta l_2$. Details regarding the construction of such a power splitter is contained in application Ser. No. 08/841021 which was filed on Apr. 29, 1997 by the present inventor.

Star coupler 2 includes a dielectric slab 220 which comprises a free-space region having two curved, preferably circular, boundaries 2a and 2b. Power transfer in star coupler 2 is accomplished through radiation in the dielectric slab 220 between its input and output waveguides. The waveguides of grating 250 are uniformly distributed along boundary 2a of star coupler 2, and are radially directed toward a focal point that resides on boundary 2b. Like star coupler 1, star coupler 2 comprises a slab of dielectric material 220 forming a free-space region having two curved, preferably circular, boundaries 2a and 2b. Output waveguides 201–216 are also connected to the free-space region 220 in a substantially uniform distribution along the boundary 2b.

Reference is now made to FIG. 2B, which visually illustrates the combination of Gaussian passbands 20a and 20b to form an overall demultiplexer passband 20. Gaussian passband 20a represents the transmission characteristic associated with one of the output legs of power splitter 102 in FIG. 2A, while Gaussian passband 20b represents the transmission characteristic associated with the other output leg of power splitter 102.

As background information it is noted that Gaussian passbands combine to create a "maximally flat" shape when the wavelength separation between adjacent passbands is equal to their bandwidth (measured between wavelengths where the power is 3 dB below the power at the central wavelength of the passband). In this situation, a normalized separation, S, between the central wavelengths of adjacent passbands is defined to be 1.00. Surprisingly, it has been found that such "maximally flat" shapes do not themselves combine to produce the widest overall passband shape for an ADM. Indeed, it has been found that the multiplexer and demultiplexer passbands should have complementary shapes (i.e., the transmission gain of one passband decreases at a rate at its band-edge wavelengths, as the wavelength moves away from the central wavelength, while the transmission gain of the other passband increases at the same rate at these wavelengths).

Referring again to FIG. 2B, the normalized separation, $S_d$, between the central wavelengths of Gaussian passbands 20a and 20b is designed to be 0.95 for demultiplexer 200. This produces a composite passband 20 for the demultiplexer whose top is generally rounded and whose 2 dB bandwidth, $B_d$, is about 60 GHz (0.48 nm) between its band-edge wavelengths $\lambda_{d1}$ and $\lambda_{d2}$. In the preferred embodiment of the invention, passband 20 is the composite of two Gaussian passbands 20a and 20b. However, it is understood that other shapes are contemplated for passband 20 such as, for example, one formed by three or more Gaussian passbands. Note that the central wavelength of demultiplexer passband 20 is designated $\lambda_C$. In the following discussion of optical multiplexers, the same central wavelength, $\lambda_C$, is used to denote that corresponding passbands of the demultiplexer and multiplexer have the same central wavelength.

Dense Wavelength-Division Multiplexer

The principle of the dense wavelength-division multiplexer (DWDM), can be described as follows: the lightwave from an input waveguide couples into the grated waveguides by the input star coupler. If there were no differential phase shift in the grating region, the lightwave propagation in the output star would appear as if it were the reciprocal propagation in the input star. The input waveguide would thus be imaged at the interface between the output slab and the output waveguides. The imaged input waveguide would be butt-coupled to one of the output waveguides. The linear length difference in the waveguide grating results in a wavelength-dependent tilt of the wave front of the lightwave in the grating waveguides, and thus shifts the input waveguide image to a wavelength-dependent position. As the wavelength changes, the input waveguide image sweeps across and couples light into different output waveguides. For a more detailed discussion, reference is made to the aforementioned article entitled: Silica-based optical integrated circuits at pages 274–276.

In the illustrative embodiment of the invention, demultiplexer 200 is a DWDM, which is suitable for performing the demultiplexing function in one direction of transmission and the multiplexing function in the other. Therefore, the following discussion of an optical multiplexer is abbreviated because the component parts of the DWDM have already been discussed.

Optical Multiplexer

Figure 3A:
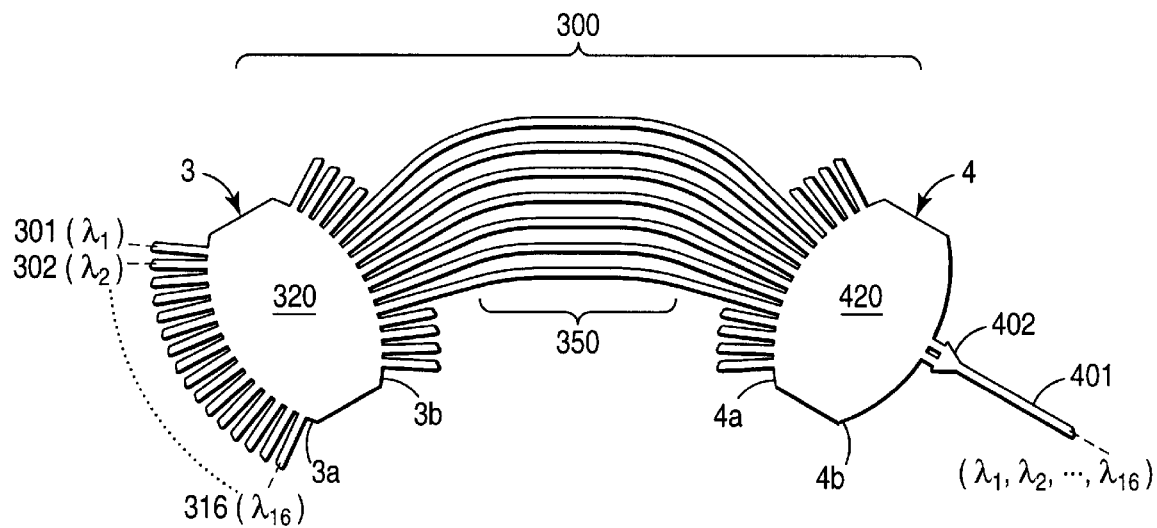
FIG. 3A discloses details of the optical multiplexer used in the ADM of FIG. 1.

FIG. 3A shows a DWDM which performs a multiplexing function in the left-to-right direction of signal propagation. A plurality of optical channels, whose central wavelengths ($\lambda_1, \lambda_2, \ldots \lambda_{16}$), are individually present on the input waveguides 301–316 of star coupler 3, which is connected to star coupler 4 via a plurality of unequal-length waveguides 350. These waveguides 350 form a diffraction grating that cause the individual input channels to be focused on power splitter 402, which combines them onto a single output waveguide 401. As discussed above, each star coupler 3, 4 respectively comprises a dielectric slab 320, 420 having input and output waveguides positioned along its opposite sides 3a, 3b and 4a, 4b.

Figure 3B:
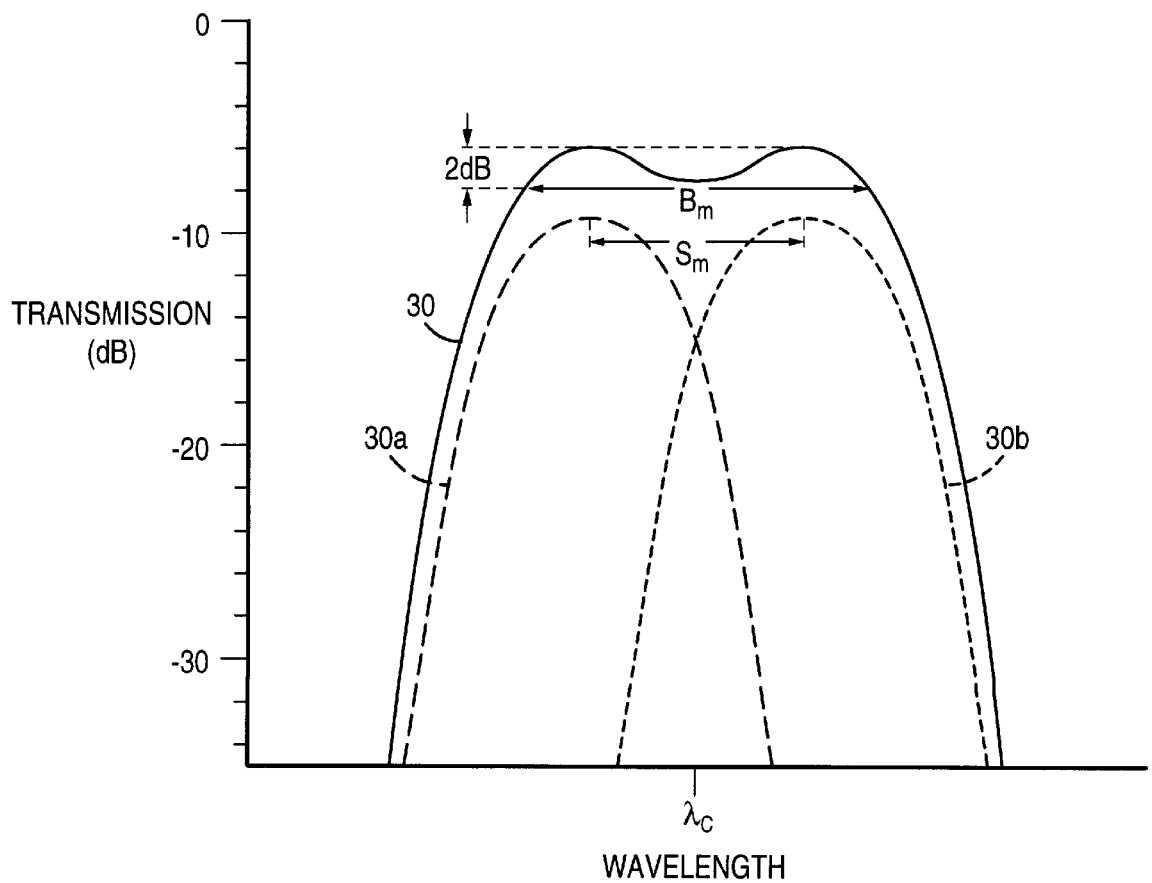
FIG. 3B shows the transmission characteristic of one representative channel of the optical multiplexer of FIG. 3A.

Reference is now made to FIG. 3B, which visually illustrates the combination of Gaussian passbands 30a and 30b to form an overall multiplexer passband 30. Gaussian passband 30a represents the transmission characteristic associated with one of the output legs of power splitter 402 in FIG. 3A, while Gaussian passband 30b represents the transmission characteristic associated with the other output leg of power splitter 402. As discussed above, although power splitter 402 is shown as conventional Y-branch splitter, the power splitting function can be accomplished by other techniques to achieve the same desired result. And the desired result is the particular shaping of the transmission characteristic of the multiplexer passband.

The normalized separation, $S_m$, between the central wavelengths of Gaussian passbands 30a and 30b is designed to be 1.4 for demultiplexer 200. This produces a composite passband 30 for the multiplexer whose top has a single ripple and whose 2 dB bandwidth, $B_m$, is about 110 GHz (1.06 nm) between its band-edge wavelengths $\lambda_{d1}$ and $\lambda_{d2}$. In the preferred embodiment of the invention, passband 20 is the composite of two Gaussian passbands 20a and 20b. However, it is understood, that other shapes are contemplated for passband 20 such as, for example, one formed by three or more Gaussian passbands. Note that the central wavelength of demultiplexer passband 20 is designated $\lambda_C$. In the following discussion of optical multiplexers, the same central wavelength, $\lambda_C$, is used to denote that corresponding passbands of the demultiplexer and multiplexer have the same central wavelength.

Figure 4:
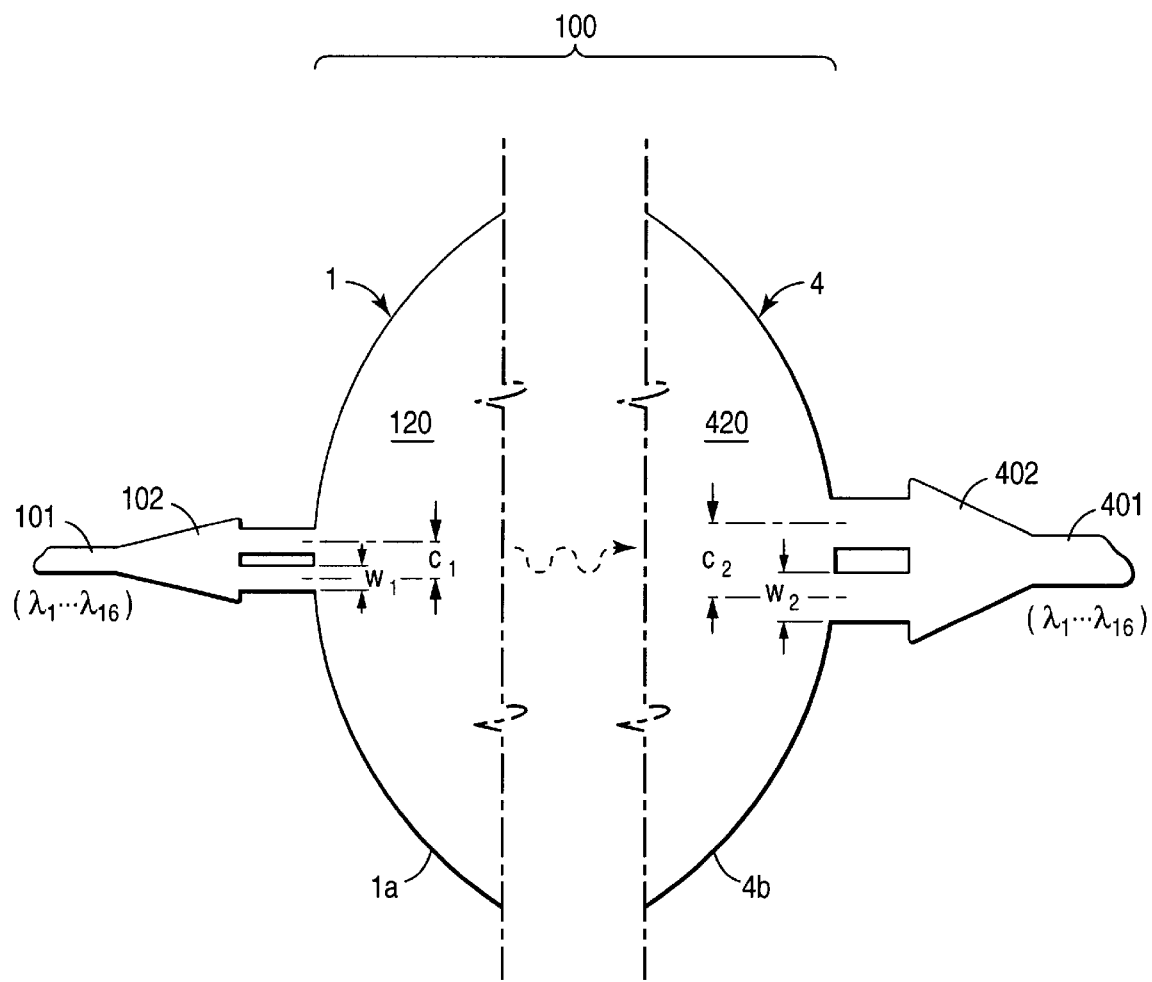
FIG. 4 is a magnified view of the input and output portions of the ADM shown in FIG. 1.

FIG. 4 provides a magnified view of certain portions of the ADM 100 shown in FIG. 1. Particular attention is drawn to the different dimensions associated with branch splitters 102 and 402. The transmission characteristic of each channel through ADM 100 is related to the mathematical convolution of the input and output waveguide mode fields. As shown in FIG. 4, splitter 102 includes a pair of waveguides, of width $w_1$, that are separated by distance $c_1$ where they impinge the boundary 1a of star coupler 1; whereas splitter 402 includes a pair of waveguides, of width $w_2$, that are separated by distance $c_2$ where they impinge the boundary 4b of star coupler 4.

In a preferred embodiment of the invention, the following dimensions are used: $c_1$=10 μm and $c_2$=16 μm; $w_1$=5.75 μm and $w_2$=8.25 μm; and the period spacing is 26.4 μm. Period spacing means the center-to-center distance between waveguides 201–216 and waveguides 301–316 (see FIGS. 2A, 3A). In this preferred embodiment, the Y-branches associated with star coupler 1 are narrower than the Y-branches associated with star coupler 4. However, because the composite transmission characteristic of the series-connected demultiplexer and multiplexer is the mathematical convolution of the waveguide geometries of the Y-branch splitters 102, 402 where they interface dielectric slabs 120 and 420 respectively, and because convolution is commutative (i.e., αb=bα), it is not surprising that equivalent performance can be achieved if the Y-branches associated with star coupler 1 are wider than the Y-branches associated with star coupler 4; and, indeed, this is the case. Accordingly, ADMs in accordance with the present invention can also be constructed with the demultiplexer having wide passbands and the multiplexer having narrow passbands. What is important is that the wide passband have a transmission characteristic that cooperates with the transmission characteristic of the narrow passband to produce a composite passband whose bandwidth is greater than the bandwidth of the narrow passband (i.e., a complementary shape in the band-edge region of the narrow passband).

Figure 5:
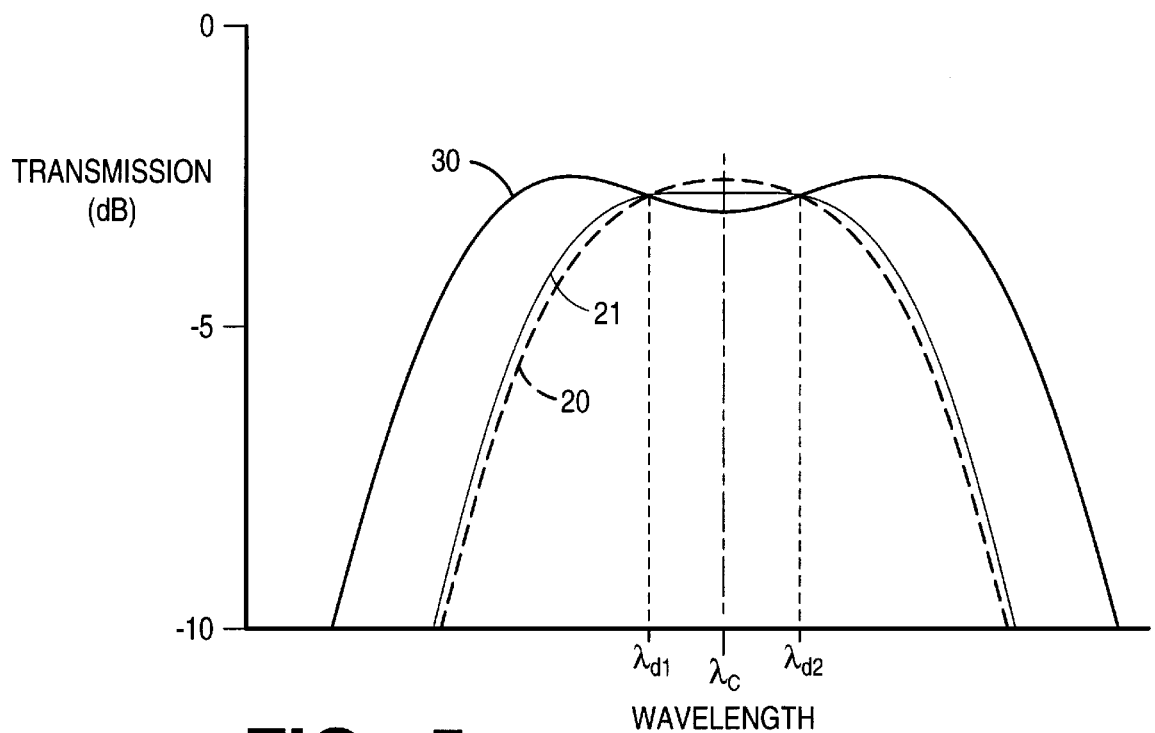
FIG. 5 shows transmission characteristics associated with representative passbands of optical multiplexers and demultiplexers.

FIG. 5 shows the transmission characteristics associated with representative passbands of optical multiplexers and demultiplexers. In the preferred embodiment of the present invention, passband 20 is the transmission characteristic associated with demultiplexer 200 and passband 30 is the transmission characteristic associated with multiplexer 300 (see FIG. 1). Passband 21 is the so-called "maximally flat" transmission characteristic which, as discussed above, is formed by combining a pair of adjacent Gaussian passbands whose wavelength separation is equal to their bandwidth (measured between wavelengths where the power is 3 dB below the power at the central wavelength of the passband).

Figure 6:
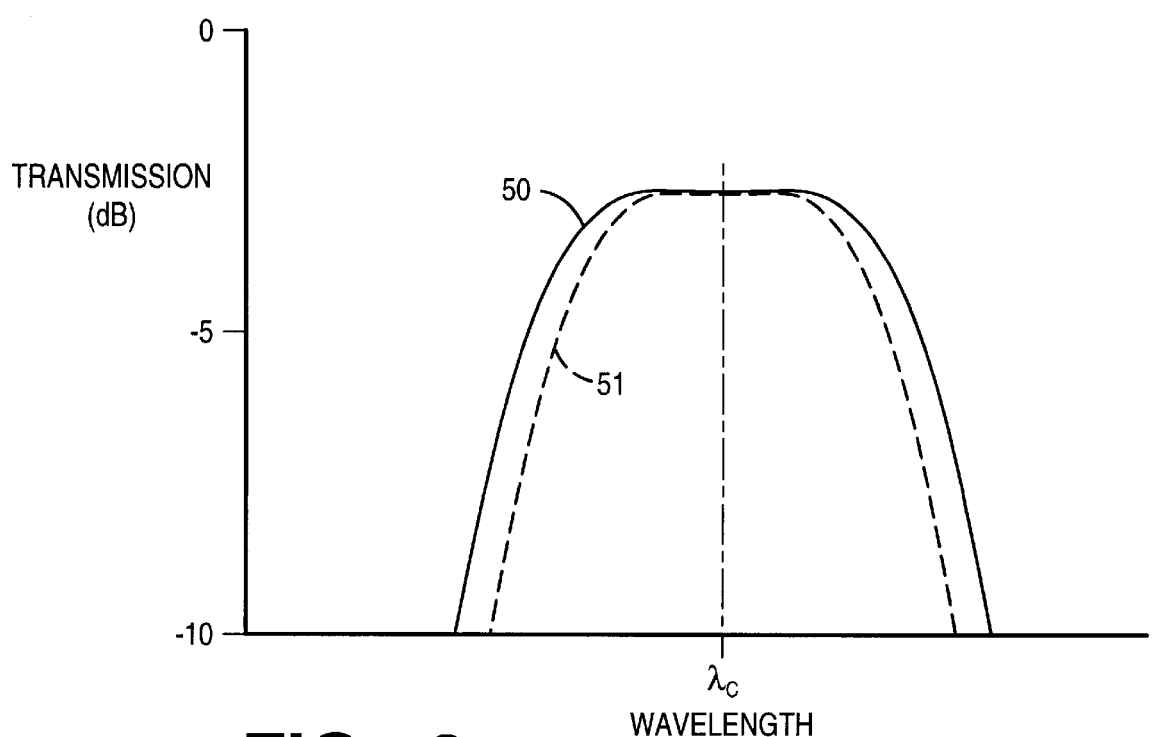
FIG. 6 shows the composite transmission characteristics for the ADM of the present invention, and for a combination of "maximally flat" passbands.

Looked at another way, all three passbands 20, 21 and 30 are the result of combining two Gaussian curves, but with different normalized separations (S). Curve 21 is the "maximally flat" curve that one achieves when S=1. Curve 20 is slightly rounded in the central wavelength ($\lambda_C$) region, which is what occurs when S<1.00 (here, S=0.95). And curve 30 has a slight depression in the central wavelength region, which is what occurs when S>1.00 (here, S=1.40). In the present invention, multiplexer passband 30 has a complementary slope to that of demultiplexer passband 20 at the band-edge wavelengths ($\lambda_{d1}$, $\lambda_{d2}$) of the demultiplexer passband. The result of combining such passbands 20, 30 together is shown in FIG. 6 as composite passband 50. Surprisingly, composite passband 50 has a greater bandwidth than composite passband 51, which is formed by combining a pair of "maximally flat" passbands, each having shape 21 as shown in FIG. 5.

Optical Wavelength-Division-Multiplex System

Figure 7:
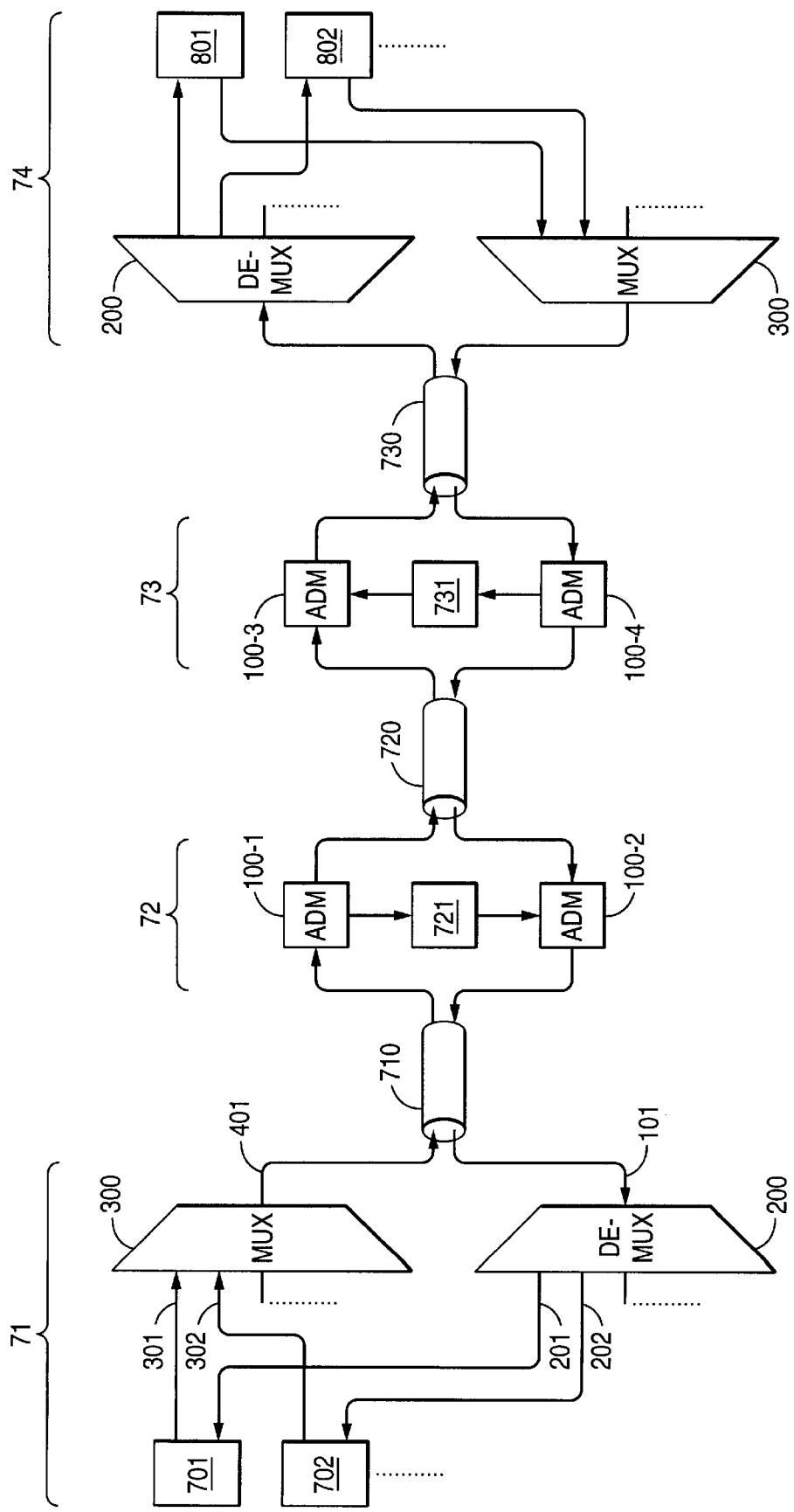
FIG. 7 discloses a wavelength-division-multiplexed system that includes a number of cascaded ADMs in each direction of transmission.

The advantages of the present invention are apparent in a wavelength-division-multiplex (WDM) system such as shown in FIG. 7. This particular WDM system comprises a near-end location 71, a plurality of intermediate locations 72–73, and a far-end location 74 that are interconnected by optical cables 710, 720, 730. Each optical cable includes a number of optical fibers, and a suitable cable design is shown in U.S. Pat. No. 5,611,016 to Fangmann et al. that issued on Mar. 11, 1997. Illustratively, one optical fiber is used for downstream transmission (i.e., from location 71 toward location 74) and another optical fiber is used for upstream transmission (i.e., from location 74 toward location 71). Each optical fiber carries a number of multiplexed channels. Illustratively, sixteen channels are available in each direction of transmission wherein each channel has a usable bandwidth of about 0.5 nm, and adjacent channels are separated by about 0.8 nm. These channels illustratively operate in the 1550 nm wavelength range. Terminals 701, 702 transmit and receive lightwave signals at a transmission rate of about 2.5 Gb/s. In the downstream direction, multiplexer 300 includes a plurality of input waveguides 301, 302 that receive lightwave signals from terminals 701, 702 and combines them for transmission over output waveguide 401. Optical waveguide 401 is then connected to an optical fiber within cable 710, which carries the multiplexed signals to intermediate location 72. This same cable 710 includes one or more optical fibers for carrying optical signals in the opposite direction. Such signals are connected to input waveguide 101 of demultiplexer 200, which separates the multiplexed signals into individual channels that are available at its output waveguides 201, 202. These output waveguides are connected to terminals 701, 702 respectively. Similar equipment is available at the far-end location 74. For example, terminals 801, 802 may be identical to terminals 701, 701. However, the present invention allows more intermediate locations 72, 73 to be chained than in the prior art WDM systems because passband narrowing is less of a problem.

At each intermediate location 72, 73, one or more ADMs (100-1, 100-2, 100-3, 100-4) are used to add and/or drop individual channels, or groups thereof For example, at locations 72, 73 terminals 721, 731 may be identical to the above-described terminal 701. In this illustrative WDM system, terminal 701 communicates with terminal 721. The downstream channel that interconnects these two terminals is dropped at ADM 100-1, whereas the upstream channel that interconnects these two terminals is added at ADM 100-2. Accordingly, the band of wavelengths, which are used for communication between terminals 701 and 721, is unused between intermediate locations 72 and 73. However, terminal 731 (at location 73) uses this band of wavelengths to communicate with terminal 801 at the far-end location 74.

For the same passband narrowing, the present invention increases the number of intermediate locations where channels can be added and/or dropped by more than a factor of two.

Although various particular embodiments of the present invention have been shown and described, modifications are possible within the spirit and scope of the invention. These modifications include, but are not limited to: the use of different power splitter designs in a DWDM to fabricate complementary transmission characteristics; the use of multiplexer and demultiplexer designs, other than DWDMs, to fabricate complementary transmission characteristics; and the use of complementary transmission characteristics in optical devices other than ADMs. And while an illustrative embodiment of the present invention shows the demultiplexer as having narrower passbands than the multiplexer, it is understood that complementary transmission characteristics can also be achieved in embodiments where the multiplexer has narrower passbands than the demultiplexer.

I claim:

1. An optical device comprising an optical multiplexer and an optical demultiplexer connected in series, the multiplexer comprising a plurality of passbands that correspond to the passbands of the demultiplexer, each passband having a central wavelength and a transmission gain that varies according to wavelength and each passband having a bandwidth that is measured between a pair of band-edge wavelengths where the transmission gain is a fixed amount below the transmission gain at its central wavelength, said corresponding passbands comprising one of the demultiplexer passbands and one of the multiplexer passbands whose central wavelengths are approximately equal to each other, one of said passbands in each pair of corresponding passbands having a narrow bandwidth and the other having a wide bandwidth, said wide passband having a transmission characteristic that cooperates with the transmission characteristic of the narrow passband to produce a composite passband whose bandwidth is greater than the bandwidth of the narrow passband.

2. The optical device of claim 1, wherein the passbands associated with the demultiplexer have the narrow bandwidths and the passbands associated with the multiplexer have the wide bandwidths.

3. The optical device of claim 1, wherein the band-edges wavelengths of each passband comprises the wavelengths where the transmission gain is 2 dB below the transmission gain at its central wavelength.

4. The optical device of claim 1, wherein the demultiplexer includes a plurality of output ports and the multiplexer includes a plurality of input ports, at least one of the output ports of the demultiplexer being connected to an input port of the multiplexer through an optical switch.

5. The optical device of claim 1 wherein the optical demultiplexer or the optical multiplexer comprises a dense wavelength-division multiplexer.

6. The optical device of claim 5 wherein the dense wavelength-division multiplexer comprises:
   first and second dielectric slabs, each have a pair of opposite sides;
   a plurality of unequal-length waveguides interconnecting one side of the first dielectric slab to one side of the second dielectric slab, each of said unequal-length waveguides having a length that differs from its nearest neighbors by a fixed amount;
   a power splitter connected to the opposite side of the first dielectric slab; and
   a plurality of waveguides connected to the opposite side of the second dielectric slab.

7. The optical device of claim 1, wherein the transmission characteristic of the narrow-bandwidth passband is formed from the combination of two Gaussian passbands having a normalized separation, S, which is less than 1.00.

8. The optical device of claim 1, wherein the transmission characteristic of the wide-bandwidth passband is formed from the combination of two Gaussian passbands having a normalized separation, S, which is greater than 1.00.

9. An optical device comprising an optical multiplexer and an optical demultiplexer connected in series, the multiplexer comprising a plurality of passbands that correspond to the passbands of the demultiplexer, each passband having a central wavelength and a transmission gain that varies according to wavelength and each passband having a bandwidth that is measured between a pair of band-edge wavelengths where the transmission gain is a fixed amount below the transmission gain at its central wavelength, said corresponding passbands comprising one of the demultiplexer passbands and one of the multiplexer passbands whose central wavelengths are approximately equal to each other, characterized in that
   one of said passbands in each pair of corresponding passbands has a narrow bandwidth and the other has a wide bandwidth;
   wherein the transmission gain of the narrow passband decreases at a first rate at its band-edge wavelengths; and
   wherein the transmission gain of the corresponding wide passband increases at a second rate, which is complementary to the first rate, at the band-edge wavelengths of the narrow passband.

10. A wavelength-division-multiplexed system for transmitting a plurality of communication channels over a transmission path, each channel occupying a different band of wavelengths, the system including a plurality of geographically separated locations that are interconnected by the transmission path, each of said locations having an add/drop multiplexer (ADM) for inserting and removing channels of optical signals from the transmission path, each ADM comprising an optical multiplexer and an optical demultiplexer connected in series, the multiplexer comprising a plurality of passbands that correspond to the passbands of the demultiplexer, each passband having a central wavelength and a transmission gain that varies according to wavelength, and each passband having a bandwidth that is measured between a pair of band-edge wavelengths where the transmission gain is a fixed amount below the transmission gain at its central wavelength, said corresponding passbands comprising one of the demultiplexer passbands and one of the multiplexer passbands whose central wavelengths are approximately equal to each other, one of said passbands in each pair of corresponding passbands having a narrow bandwidth and the other having a wide bandwidth, said wide passband having a transmission characteristic that cooperates with the transmission characteristic of the narrow passband to produce a composite passband whose bandwidth is greater than the bandwidth of the narrow passband.

11. The wavelength-division-multiplexed system of claim 10 further including a near-end location that connects to one of the geographically separated locations via the transmission path, the source location including;
   a plurality of sources of optical signals, each of said sources generating optical signals that reside in a passband having a different central wavelength; and
   a multiplexer for combining the plural sources of optical signals onto a single waveguide for transmission over the transmission path.

12. The wavelength-division-multiplexed system of claim 11 further including a far-end location that connects to another of the geographically separated locations over the transmission path, the terminus location including;
   a demultiplexer, responsive to a multiplexed optical signal on a single waveguide for separating same into a plurality of the plural sources of optical signals onto a single waveguide for transmission over the transmission path
   a plurality of sources of optical signals, each of said sources receiving optical signals that reside in a passband having a different central wavelength.

13. The wavelength-division-multiplexed system of claim 10 wherein the transmission path includes optical cables.

* * * * *